(12) United States Patent
Tian et al.

(10) Patent No.: US 9,135,183 B2
(45) Date of Patent: Sep. 15, 2015

(54) MULTI-THREADED MEMORY MANAGEMENT

(71) Applicant: SAMSUNG ELECTRONICS CO., LTD., Suwon, Gyeonggi-Do (KR)

(72) Inventors: Chen Tian, Union City, CA (US); Daniel G. Waddington, Morgan Hill, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 13/975,022

(22) Filed: Aug. 23, 2013

(65) Prior Publication Data

US 2014/0281363 A1     Sep. 18, 2014

Related U.S. Application Data

(60) Provisional application No. 61/779,763, filed on Mar. 13, 2013.

(51) Int. Cl.
   *G06F 3/06* (2006.01)
   *G06F 12/10* (2006.01)
   *G06F 13/38* (2006.01)

(52) U.S. Cl.
   CPC ............ *G06F 12/10* (2013.01); *G06F 12/1027* (2013.01)

(58) Field of Classification Search
   None
   See application file for complete search history.

(56) References Cited

U.S. PATENT DOCUMENTS

2009/0172690 A1 *  7/2009  Zimmer et al. ............... 718/104

OTHER PUBLICATIONS

Intel Corporation, "IA—32 Intel Architecture Software Developers Manual vol. 3: System Programming Guide", 2003, pp. 1-798, United States.
Intel Copporation, "Avoiding Heap Contention Among Threads", Nov. 2, 2011, pp. 1-4, Intel Developer Zone, United States.
Manley, K., "Improving Performance with Thread-Private Heaps", Sep. 1, 1999, Dr. Dobb's The World of Software Development, pp. 1-9, United States.
Advanced Micro Devices, Inc., "AMD64 Technology, AMD64 Architecture Programmer's Manual vol. 2: System Programming", Jun. 2010, pp. 1-552, United States.

* cited by examiner

*Primary Examiner* — Scott Sun
(74) *Attorney, Agent, or Firm* — Sherman IP LLP; Kenneth L. Sherman; Steven Laut

(57) ABSTRACT

Memory management includes maintaining a first mapping structure for each thread of a multi-threaded process. A second mapping structure is maintained for each core of a multi-core processing device. A global mapping structure for shared memory mappings is maintained. During thread context switches, copying thread context entries without modifying a page-mapping base address register of each core of the multi-core processing device.

27 Claims, 16 Drawing Sheets

```
main()
{
    void * shared = mmap_allocate_shared_page();
    start_thread1 (shared);
    start_thread2 (shared);
    join_threads;
    munmap(shared)
} void thread1_entry(void * shared_page)
{
    for(i in 1..N) {
        p = allocate_private_page();
        write_data(p);
        write_data(shared_page);
        release_private_page(p);
        expand_shared_page(shared_page);
    }
} void thread2_entry(void * shared_page)
{
    for(i in 1..N) {
        p = allocate_private_page();
        write_data(p);
        write_data(shared_page);
        release_private_page(p);
        expand_shared_page(shared_page);
    }
}
```

FIG. 9

MULTI-THREADED MEMORY MANAGEMENT

CROSS-REFERENCE TO RELATED APPLICATIONS

This application claims the priority benefit of U.S. Provisional Patent Application Ser. No. 61/779,763, filed Mar. 13, 2013, incorporated herein by reference in its entirety.

TECHNICAL FIELD

One or more embodiments relate generally to memory management for multi-core processors, and in particular, to a memory mapping architecture for multi-core processors including a per-thread mapping structure and a per-core mapping structure.

BACKGROUND

Virtual memory is widely used in multi-tasking Operating Systems (OS) running on modern processors. Virtual memory is a memory management technique that allows physical memory or other data storage (e.g., disk or I/O memory) to be virtualized so that each application only sees one kind of memory. This simplifies the implementation of applications and provides a better memory protection. On typical computer systems, the implementation of virtual memory must rely on a kernel data structure that maintains the mapping from virtual memory to physical memory.

SUMMARY

One or more embodiments relate to a memory management technique for multi-core processing systems that execute multi-threaded processes or applications. In one embodiment, a method for memory management includes maintaining a first mapping structure for each thread of a multi-threaded process. In one embodiment, a second mapping structure is maintained for each core of a multi-core processing device. In one embodiment, a global mapping structure for shared memory mappings is maintained. In one embodiment, during thread context switches, copying of thread context entries without modifying a page-mapping base address register of each core of the multi-core processing device is performed.

In one embodiment, a system comprises a multi-core processor having a plurality of processor cores each coupled to a page-mapping base address register. A memory including a mapping architecture comprises: a first mapping structure for each thread of a multi-threaded process executed by the plurality of cores, a second mapping structure for each core of the plurality of cores, and a global mapping structure for shared memory mappings of each thread of the multi-threaded process. In one embodiment, a page-fault handler synchronizes data in the global mapping structure and a particular second mapping structure.

In one embodiment, a non-transitory computer-readable medium having instructions which when executed on a computer perform a method that comprises creating a first mapping structure for each thread of a multi-threaded process, creating a second mapping structure for each core of a multi-core processing device, creating a global mapping structure for maintaining shared memory mappings, and performing a copy of thread context entries during thread context switches without modifying a page-mapping base address register of each core of the multi-core processing device.

In one embodiment, a server comprises a multi-core processor having a plurality of processor cores. In one embodiment, each processing core comprising a page-mapping base address register and a translation lookaside buffer (TLB). In one embodiment, the server further comprises a plurality of page directories, wherein each processing core of the plurality of processing cores is coupled to a corresponding page directory. In one embodiment, the server comprises a plurality of page tables, wherein each processing core of the plurality of processing cores is coupled to a corresponding page table. A global page table is coupled to each page directory of the plurality of page directories.

These and other features, aspects and advantages of the one or more embodiments will become understood with reference to the following description, appended claims and accompanying figures.

BRIEF DESCRIPTION OF THE DRAWINGS

FIG. 9 shows example pseudo-code for a per-core VPMS, per-thread-VPMS memory architecture, according to an embodiment.

DETAILED DESCRIPTION

One or more embodiments relate to memory management for multi-core processing systems that execute multi-threaded processes or applications. In one embodiment, a method for memory management includes maintaining a first mapping structure for each thread of a multi-threaded process. In one embodiment, a second mapping structure is maintained for each core of a multi-core processing device. In one embodiment, a global mapping structure for shared memory mappings is maintained. In one embodiment, during thread context switches, copying of context thread entries without modifying a page-mapping base address register of each core of the multi-core processing device is performed.

One or more embodiments use a virtual-physical address mapping structure (VPMS) on a per-core and per-thread basis for multi-core processing systems. The exact nature and design of the VPMS is dependent on the underlying hardware. In one or more embodiments, the memory layout and VPMS is redesigned for multi-threaded applications so that the overhead of threads updating VPMS of the same process is reduced by minimizing synchronization and TLB flush operations. The system is more reliable by strongly isolating threads within the same process. One or more embodiments make is easier for developers to debug memory concurrency issues that often arise in multithreaded programs.

In one embodiment, a memory management architecture is defined that is scalable. One embodiment comprises of a set of per-core VPMS and per-thread VPMS. A global VPMS is maintained for shared memory mappings allowing mapping changes to be propagated to different threads. In one embodiment, TLB flushing is avoided by performing a copy during thread context switches (of the same process) without modifying the VPMS base address register (BAR), which is distinguishable from typical systems as many micro-architectures would perform a complete TLB flush, which impacts performance. In one embodiment, virtual memory used by each thread in an application is partitioned into shared and private regions. In one embodiment, programming language primitives and/or specialized memory management APIs are used to support the designation of dynamically allocated memory types (i.e., private vs. local).

Figure 1A:
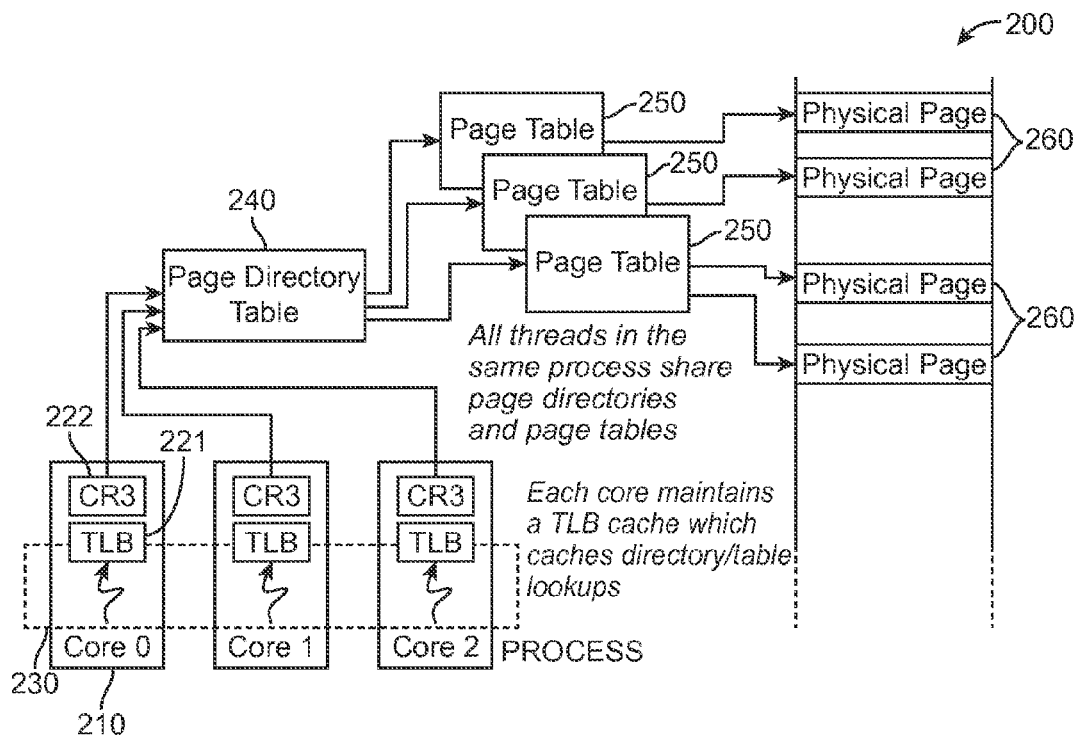
FIG. 1A shows a block diagram of a typical 32 bit system including a page directory and page tables.
Figure 1B:
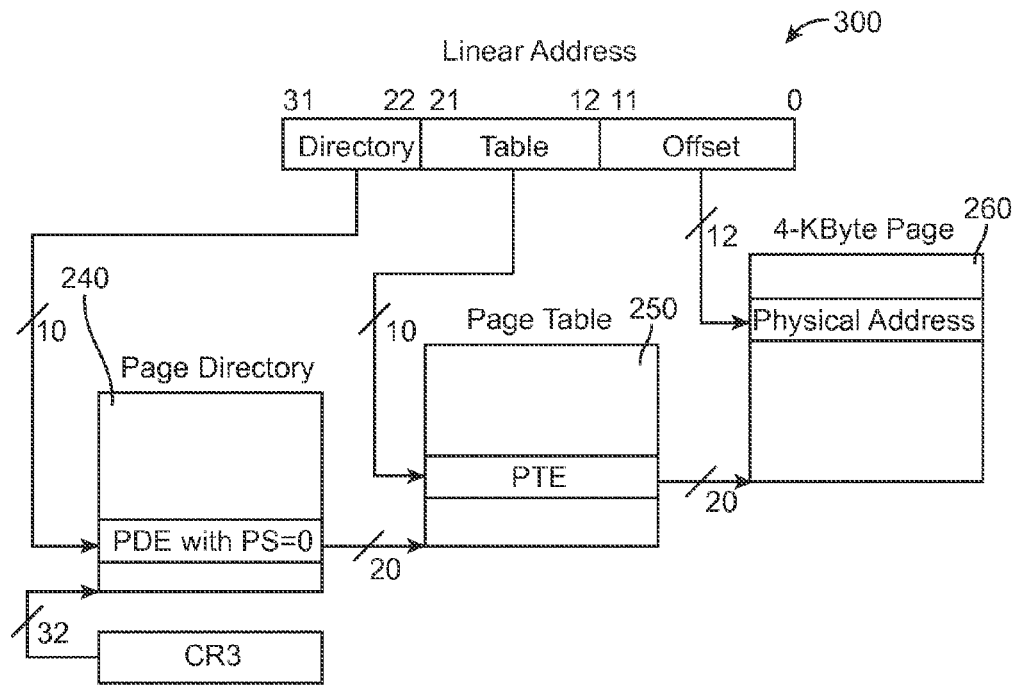
FIG. 1B shows a block diagram of the bit structure for the system shown in FIG. 1A.

FIG. 1A shows a block diagram of a typical 32 bit system 200 including multiple processing cores 210, a page directory 240 and page tables 250. FIG. 1B shows a block diagram of the bit structure 300 for the system 200 shown in FIG. 1A. System 200 shows a hierarchical arrangement of a page directory 240 and page tables 250 that is typically used on Intel IA32 and AMD AMD64 architectures. On IA32, each page directory entry points to a different page table 250, and each page table entry points to a page 260, a mapping granularity whose size may be either 4096 bytes or 4 MB. Other architectures (e.g., IA64) may deepen the hierarchy with additional levels of page directory nesting that allows a broader physical address space to be addressed.

When a memory access instruction is executed on a processor for a process 230 (e.g., a thread or application process), the processor translates the virtual memory address to a physical address by looking up the VPMS. To improve performance, processors may incorporate a translation lookaside buffer (TLB) 221 that caches virtual-to-physical memory mapping (since VPMS lookup may be relatively slow). If TLB cache does not return a valid mapping, a processor core 210 needs to walk through the VPMS stored in memory. The starting address of the VPMS is stored in a special register VPMS base address register (BAR). For example, an Intel processor uses a CR3 (see FIG. 1B) as a VPMS BAR. If the mapping cannot be found, the processor core 210 typically generates a page-fault signal and calls an interrupt handler implemented in the operating system (OS). The handler typically finds a free physical page 260 and populates the corresponding entry in the VPMS. After that, the faulting application resumes.

In a multi-tasking OS, each process 230 can only execute for a period of time on a processing unit (e.g., CPU), and is switched to another process when the period ends. This is known as a context switch. During a context switch, the VPMS of the new process must be reinstalled by reloading the VPMS BAR (e.g., CR3 in FIG. 1B) and flushing the TLB 221. This operation is considerably expensive (time wise) due to the subsequent TLB cache misses that arise from flushing the TLB. Therefore, a multi-threaded application is used where multiple threads may be created within a process to perform tasks in parallel, and still share the same VPMS.

On multi-core processors (e.g., in system 200), each core 210 has a separate VPMS BAR (e.g., CR3 222) and TLB 221. When multiple processes 230 are executed on different cores 210, these BARs hold different VPMS base addresses. Therefore, modification of one process's VPMS does not affect the execution of another process 230. In the case of a multi-threaded application where threads of the same process 230 are executed on different cores 210, however, all BARs of those used cores 210 must point to the same VPMS, the one that stores address mappings that are specific to the process 230. While this method is simple to implement and keeps context switch overhead low, it creates scalability and performance issues when threads are running on different cores 210. The reason is that when two threads running on different cores 210 try to add two entries into the VPMS at the same time, a lock must be used to serialize the two operations (in order to ensure correctness). Further, for OSs that allow applications to indirectly modify VPMS (e.g., delete an entry), the TLB of all relevant cores must be flushed (by the OS) to ensure correct memory coherence. This results in significant overhead due to subsequent cache misses that are unnecessary (i.e., the flushing is conservative).

Figure 2:
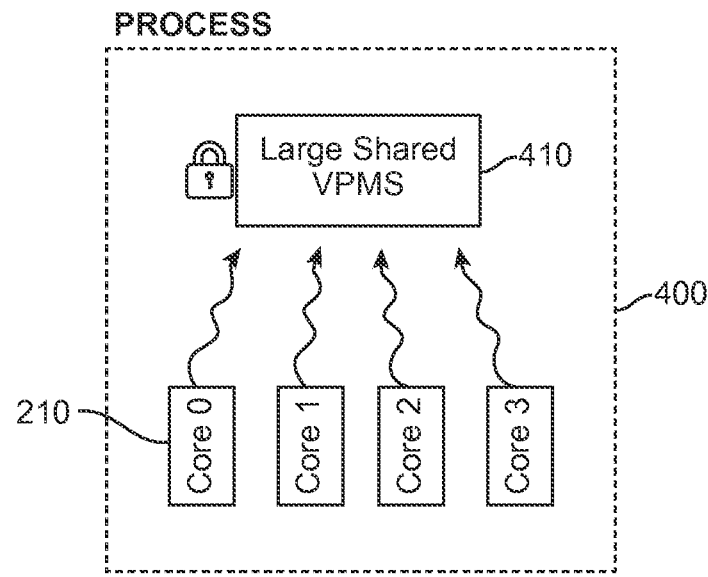
FIG. 2 shows an example multi-core system using a shared virtual-physical memory structure (VPMS).
Figure 3:
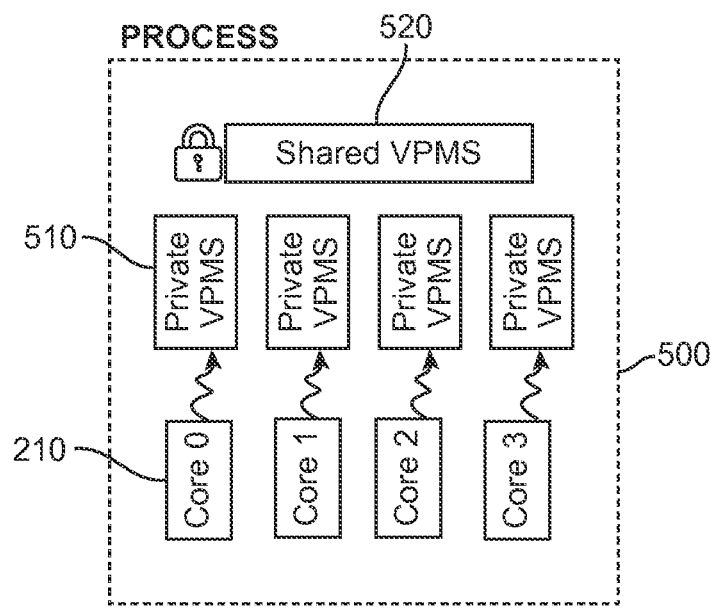
FIG. 3 shows a block diagram of a multi-core system using multiple private VPMSs and a shared VPMS, according to an embodiment.

FIG. 2 shows an example multi-core system 400 that uses a shared VPMS 410 for the processing cores 210. As shown, the threads or processes from each core 210 share the large VPMS 410. FIG. 3 shows a block diagram of a multi-core system 500 using multiple private VPMS 510 and a shared VPMS 520 for multiple processing cores 210, according to an embodiment. The shared VPMS 520 is small as compared to the larger shared VPMS for the system 400. In one embodiment, the system 500 addresses scalability issues caused by memory contention on VPMS in highly threaded processes. In one embodiment, the use of the private VPMSs 510 reduces VPMS sharing across threads that belong to the same process (normally all threads share the same VPMS). One or more embodiments provide separating shared and private memories on a per-thread basis, thus scoping the need for serialization and locking to only that memory that must be shared between threads.

In one or more embodiments, a memory management architecture is defined that is scalable as compared with existing solutions. One or more embodiments comprise a set of per-core VPMS and per-thread VPMS. In one embodiment, a global VPMS is maintained for shared memory mappings allowing mapping changes to be easily propagated to different threads. In one embodiment, TLB flushing is avoided by performing a copy during thread context switches (of the same process) without modifying the VPMS BAR (i.e., not causing a complete TLB flush increasing performance). In one embodiment, virtual memory used by each thread in an application is partitioned into shared and private areas. In one embodiment, programming language primitives and/or specialized memory management APIs are used to support the designation of dynamically allocated memory types (i.e., private vs. local).

Figure 4:
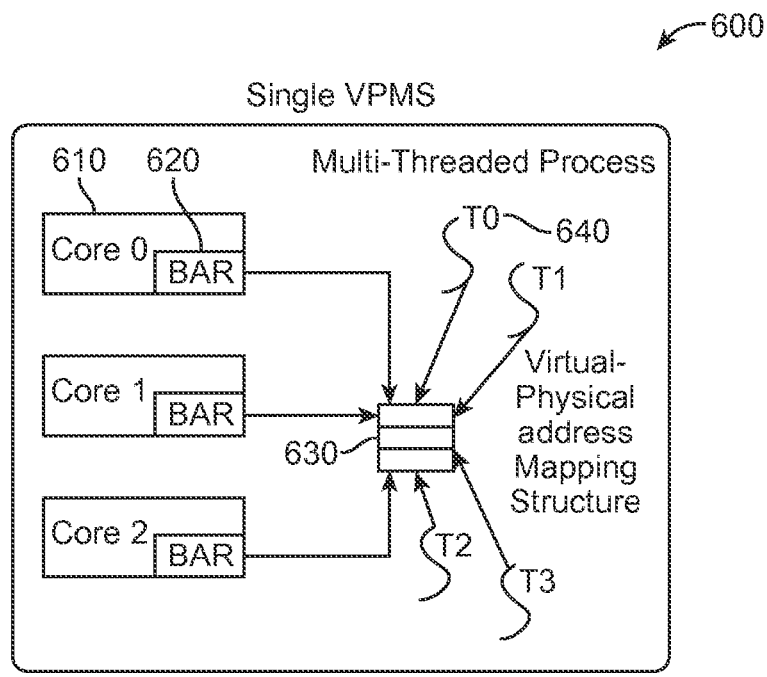
FIG. 4 shows an example multi-core system using a single VPMS for a multi-threaded process.

FIG. 4 shows an example multi-core system 600 using a single VPMS 630 for a multi-threaded 640 process. Each multi-threaded process 640 has only one VPMS 630. All cores 610 on which threads are executing, load the starting address of the VPMS into their BARs 620. When a modification to the VPMS 630 is made on one of these cores 610 the corresponding structure needs to be locked to prevent concurrency race conditions (and thus loss of correctness) from occurring. Moreover, the TLB in every core 610 needs to be flushed in order to provide a coherent view of VPMS. This action causes a significant performance overhead (both in performing the flush and the effect of subsequent TLB cache misses).

Figure 5:
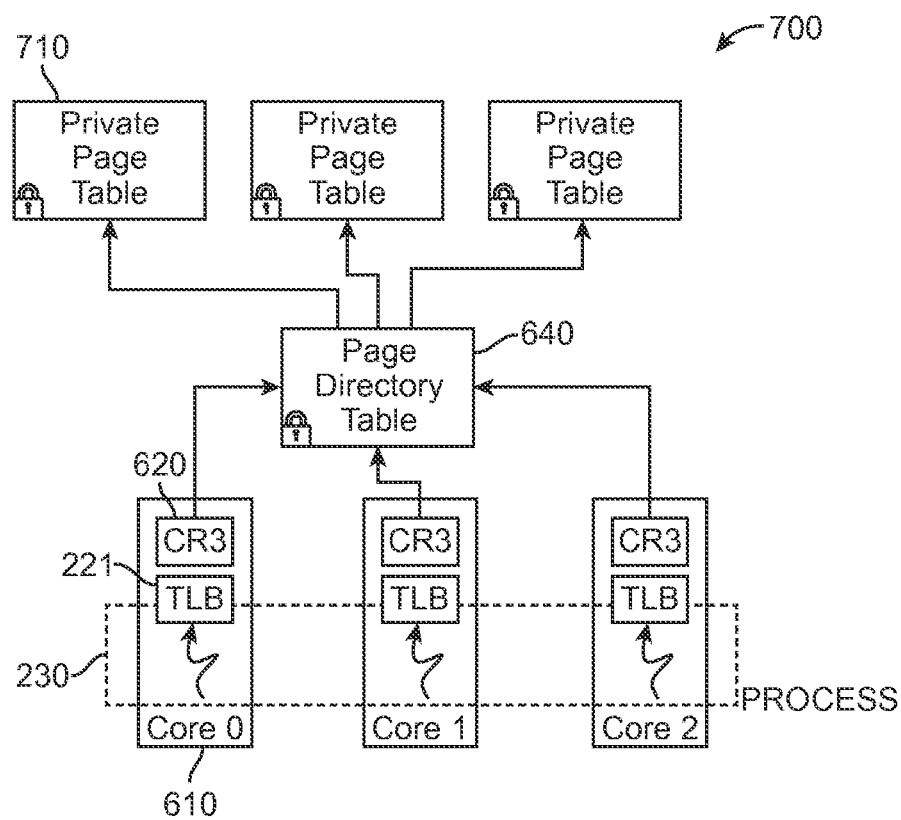
FIG. 5 shows a typical locking architecture for a typical 32 bit system including a page directory and page tables.

FIG. 5 shows a typical locking architecture for a typical 32 bit system 700 including a page directory 640 and page tables 710. System 700 shows an example on IA32. Each VPMS contains one page directory table (PD) 640 and a set of page tables 710 pointed by PD entries (PDE). The BAR on each core 610 is called the CR3 620 register. A memory lock needs to be taken when any PDE or page table entry (PTE) is updated. The TLB also needs to be flushed on all cores 610 to ensure the coherence even if those cores 610 that do not touch memory pointed by the updated mapping entry.

Figure 6:
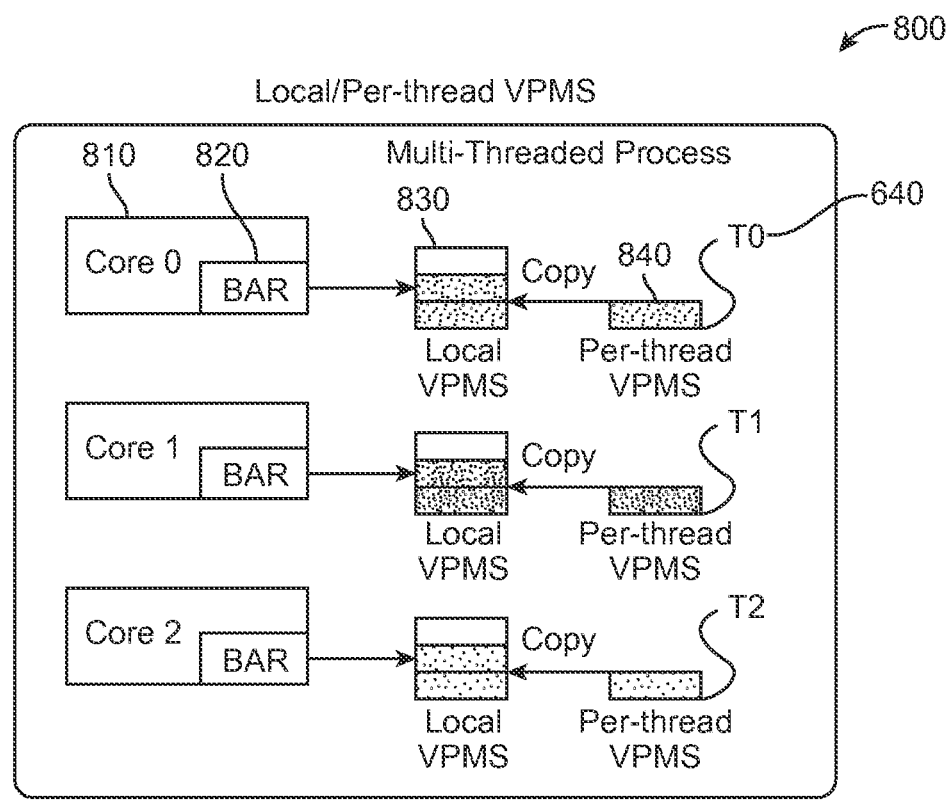
FIG. 6 shows a block diagram of a multi-core system including scalable per-core VPMS, per-thread VPMS, according to an embodiment.

FIG. 6 shows a block diagram of a multi-core system 800 including scalable per-core VPMS (local VPMS 830), per-thread VPMS 840 for multiple cores 810, according to an embodiment. In one or more embodiments, to reduce possible contention on VPMS access and minimize unnecessary TLB flushing, the scalable VPMS architecture is used that comprises a set of per-core VPMS 830 (also called local VPMS) for cores 810 and per-thread VPMS 840 for threads 640. In one embodiment, each core 810 has a local VPMS 830 and the BAR 820 on each core 810 points to the address of the corresponding local VPMS 830. Each thread context (used to store that state of a thread 640 at point of scheduling) includes local VPMS data (e.g., a few machine words).

In one embodiment, when a thread T0 640 is switched onto a core 1 810 on which another thread T1 640 in the same process is running, the content of the core 1 810 local VPMS 830 will be first saved into T1's per-thread VPMS 840, and the content in T0's per-thread VPMS 840 will be copied into core 1 810 local VPMS 830. In one embodiment, as long as the switching occurs among threads in the same process, the BAR address is never updated, and all implicit TLB flushes normally caused by BAR 820 updates are avoided.

In one embodiment, the scalable VPMS used in system 800 present an opportunity to reduce the lock protection on VPMS access for multi-threaded applications. Specifically, all threads running in the same process have not only shared memory, but also private memory areas such as stack. Since the mapping entries in VPMS are indexed by virtual memory address, those entries that correspond to thread's private memory area only need to be seen by the thread itself, according to one embodiment. Thus, synchronization is not required on these entries. In one embodiment, for each thread 640 in a multi-threaded application, three regions are created from virtual memory space: an instruction region, a private region, and a shared memory region.

In one embodiment, the instruction region comprises a virtual memory area that contains the instructions of a process. In one embodiment, the instruction region is shared by all threads 640 in a read-only fashion. In one embodiment, the corresponding VPMS mapping entries for the instruction region are as follows: 1) storage: entries are initialized by the loader. The entries are copied into a cores 810 local VPMS 830 from process context when the thread 640 is switched onto the core 810, and saved in process context when a thread 640 from a different process is switched in; 2) synchronization: none needed, since memory is read-only.

In one embodiment, the private memory region is provided such that each thread 640 has a distinct private memory region for its thread-local heap and stack data. In one embodiment, thread-local heap allows a memory allocator to allocate heap memory for each thread 640 without any synchronization. In one embodiment, specialized APIs and/or compiler extensions are provided to support the designation of heap memory as thread-local.

In one embodiment, an example with API extensions may comprise:

```
/* example with API extensions */
void * p = thread_local_malloc(s);
thread_local_free(p);
``` another example may comprise:

```
/* example with C++ new placement operator */
Obj* p = new (local) Obj( );
/* C++ deletion of placement allocated object (assuming no
availability of placement delete)
p->~Obj( );
operator delete(p, local);
```

In one embodiment, the thread-local stack data is similar to thread-local heap. In one embodiment, an example assumes that all programming variables are thread-local. There is generally no reason to share stack variables that are scoped by the language (this can be dangerous from a correctness point of view). In one embodiment, all VPMS mapping entries that provide mapping for the private memory area are managed as follows:

1. Storage: copied from a thread's per-thread VPMS 840 into local VPMS 830 when the thread 640 is switched in; saved in per-thread VPMS 840 and cleared from local VPMS 830 when a different thread 640 is switched in. In one embodiment, when a VPMS entry is deleted, only the TLB of the current core 810 is flushed.
2. Synchronization: None needed.

In one embodiment, the shared memory region is provided such that one or more virtual memory areas including a global data section may be marked as shared memory regions. In one embodiment, the VPMS entries corresponding to shared memory pages are managed as follows:

1. Storage: entries are updated by different threads 640. Entries are copied into a core's 810 local VPMS 830 from process context upon process switch-in, and saved in the process context during switch-out. In one embodiment, upon a switch between two threads 640 in the same process, there is no change. In one embodiment, since different threads 640 on different cores 810 may add/lookup/delete some entries, a global VPMS (e.g., FIG. 10, 1070) is used to synchronize these actions. Table I below shows the details. Note: 1.) book-keeping is used to maintain the collection of cores 810 that are accessing a shared page; 2.) TLB entries that must be revoked due to changes in VPMS entries corresponding to shared pages may be eliminated either by a complete TLB flush on the corresponding cores 810, or more preferably by using a target's TLB "knockdown" (e.g., via the IA32 INVLPG/INVLPGA instructions) that is provided by many micro-architectures and allows specific entries from the TLB to be flushed.

2. Synchronization: Needed.

TABLE I

| Insert a mapping for a shared memory page X: | Delete a mapping for a shared memory page X: |
|---|---|
| 1. get a physical address Y; | 10. m = local__VPMS.findMapping(X); |
| 2. lock (gloal__VPMS__lock); | 11. remove mapping m from local__VPMS; |
| 3. if (m == global__VPMS.findMapping(X)) | 12. lock (global__VPMS__lock); |
| 4.     update local__VPMS with mapping m; | 13. remove mapping m from global__VPMS ; |
| 5.     bookkeeping that core " C accessed m" | 14. unlock (global__VPMS__lock); |
|    else | 15. for each core C whose local__VPMS has mapping m |
| 6.     update local__VPMS with mapping m; | 16.     remove mapping m; //lock is needed |
| 7.     update global__VPMS with mapping (X, Y); | 17.     flush C's TLB or knock-down specific entries ; |
| 8. endif | 18. endfor |
| 9. unlock (gloal__VPMS__lock); | |

In one embodiment, to synchronize shared memory's mapping entries across different cores 810, a global VPMS, is introduced. In one embodiment, the global VPMS is maintained at a process level. In one embodiment, the global VPMS only has mapping entries for the shared memory region. In one embodiment, the insertion and deletion of share memory mapping entries is defined in Table I. In one embodiment, lock synchronization is needed when accessing shared memory entries in both global VPMS and local VPMS 830. In one embodiment, synchronization between the local VPMS 830 and the global VPMS is triggered by a thread Page-Fault. That is, when a thread attempts to access a shared memory page, a Page-Fault occurs. In one embodiment, a Page-Fault handler must then perform the necessary global VPMS look up and synchronization with the local VPMS 830.

In one or more embodiments, lock synchronization is reduced because instead of synchronizing for every VPMS access, this approach only requires synchronization on the access of VPMS elements corresponding to shared memory. Even without contention, access to a lock can cost hundreds of cycles due to serialization of the critical sections. In one embodiment, TLB flushing is minimized. Switching threads in a same process does not cause TLB flushing because the VPMS BAR 820 does not update. Although deletions of VPMS entries cause TLB flushing, unnecessary flushing is still avoided. In one embodiment, if a VPMS entry points to a private area, only the TLB of the local core 810 is flushed. If the VPMS entry points to a shared memory area, cross-core TLB flushing is only performed for a core 810 from which a thread 640 accessed the same memory area. In one embodiment, a broad TLB flush (i.e., on all cores 810) causes all TLB cache entries for the process to be removed. Each subsequent TLB miss typically causes a penalty of 10-100 cycles. In one embodiment, stronger isolation between threads 640 in the same process is provided. This makes debugging memory related issues in a multi-threaded application much easier.

Figure 7:
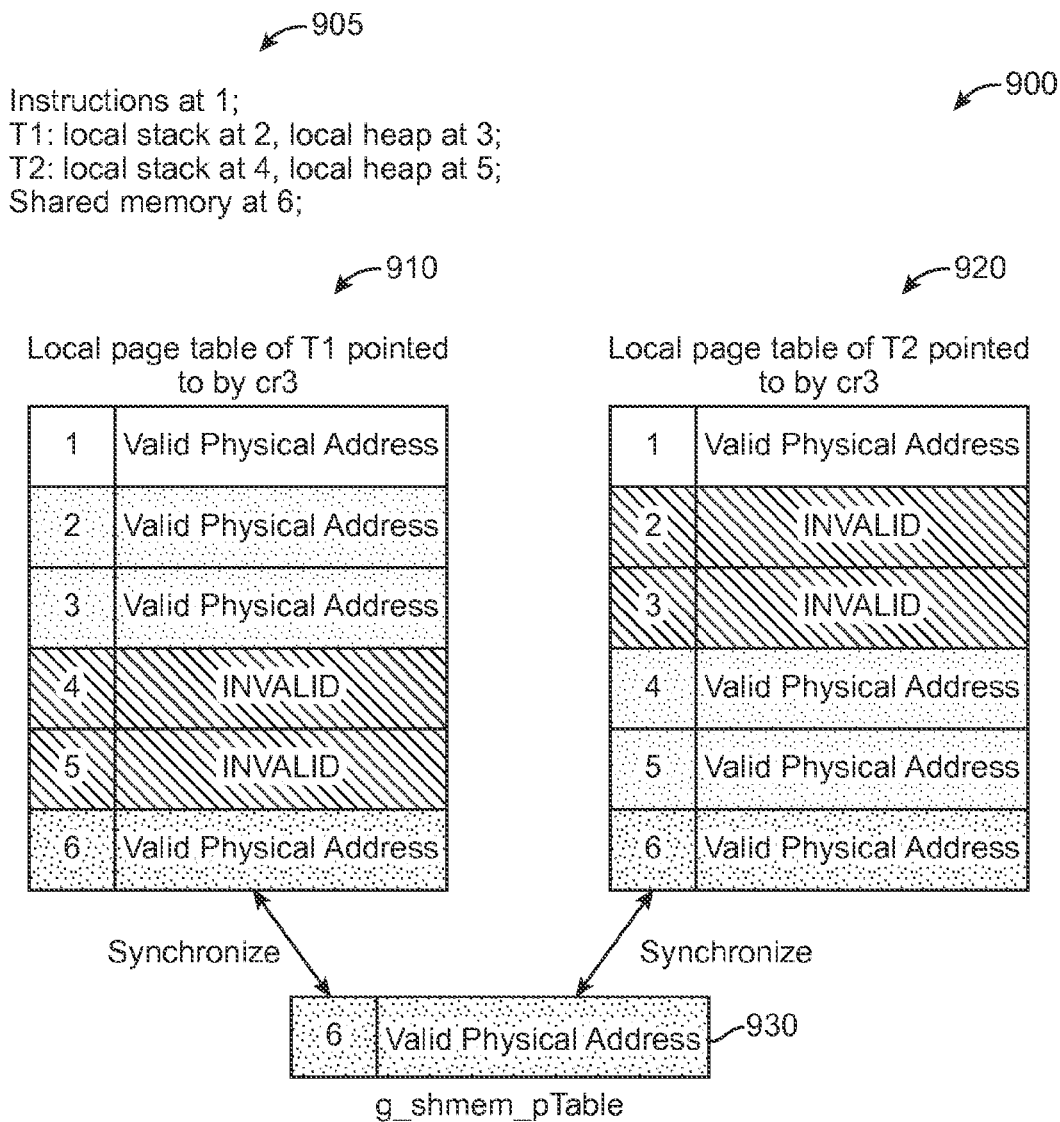
FIG. 7 shows an example per-thread VPMS operational diagram for a multi-threaded process, according to an embodiment.

FIG. 7 shows an example per-thread VPMS operational diagram 900 for a multi-threaded process, according to an embodiment. In one example embodiment, the local VPMS (e.g., FIG. 6, 830) pointed to by separate BARs (e.g., FIG. 6, 820) of two threads (e.g., FIG. 6, 640) running on different cores (e.g., FIG. 6, 810). In one embodiment, suppose instructions 905 are at location 1 (virtual address) of the local page table 910, and T1 has local stack and heap at locations 2 and 3, while T2 has these in local page table 920 at locations 4 and 5, respectively. Shared memory is located in page 930 at location 6. The local VPMS of each thread will have the structure as shown in the diagram 900. In particular, in one embodiment all mapping entries of the memory that do not belong to the thread regions of a thread are set to INVALID. In this way, any illegal memory access of a thread will be caught by a Page-Fault handler.

Figure 8:
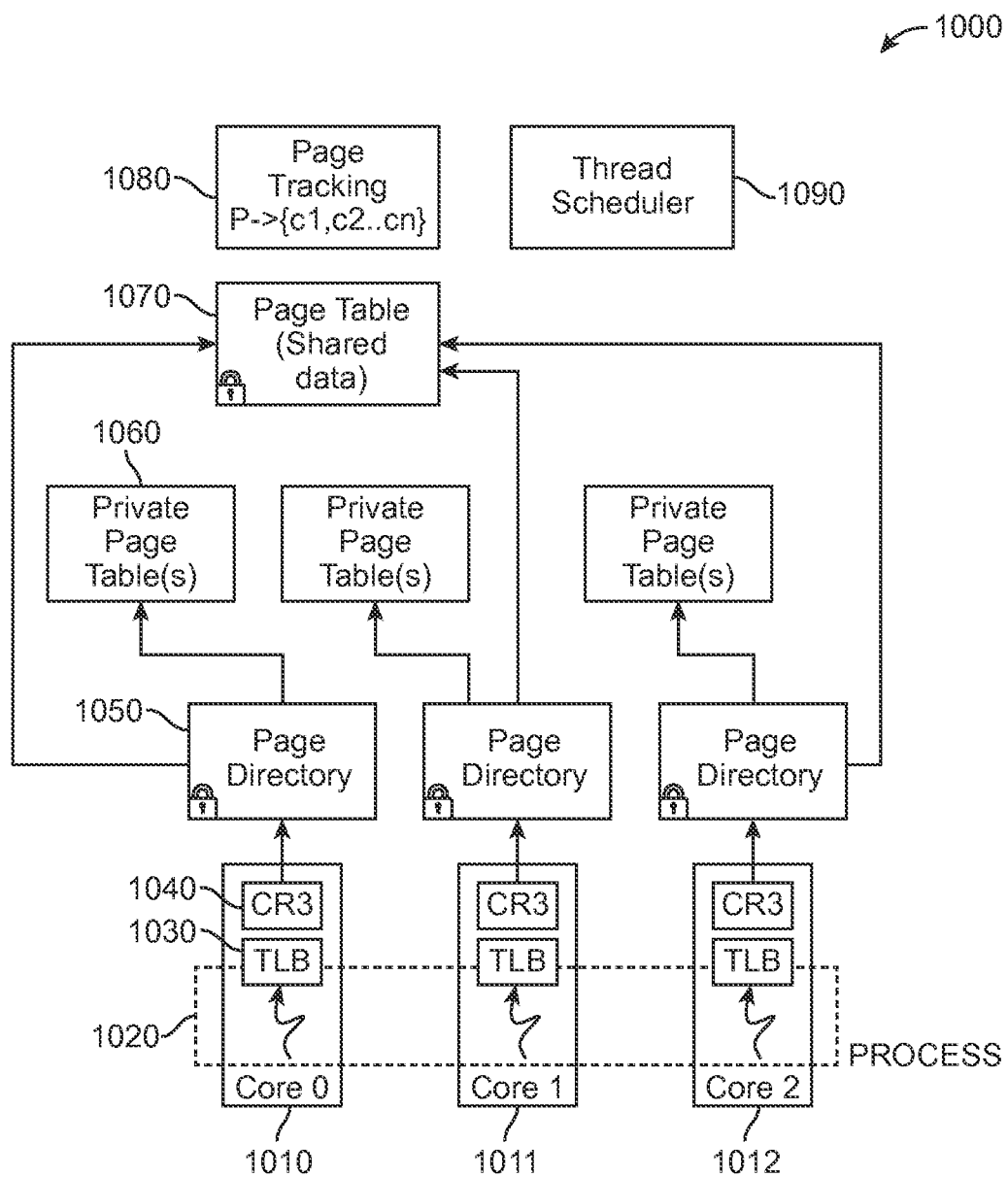
FIG. 8 shows an example architecture using multiple page directories, multiple private page tables, and a shared page table for a multi-core system, according to an embodiment.

FIG. 8 shows example architecture 1000 using multiple page directories 1050, multiple private page tables 1060, and a shared page table 1070 for a multi-core 1010 system, according to an embodiment. In one embodiment, the system 1010 is designed as an Intel IA32 type of system. It should be noted that the term VPMS as used herein may have different implementations on different platforms. As shown on FIG. 5, an IA32 platform (e.g., system 700) has a two-level structure VPMS, namely PD and PT, and the base address of the PD is stored in CR3 620 register.

In one embodiment, assume that a multi-threaded application 1020 has at most 1024 threads and each thread has a total 4 MB private memory. Since each PT 1060 covers 4K memory and each PD entry manages 1024 PTs in a PT page, in one embodiment, the PT page is constructed for each thread to manage their different 4 MB private memory areas. The address of the PT page of a thread is used to fill a core's 1010 PD 1050 at the right slot when a thread is active on the core 1010. In one embodiment, the number of machine words copied from global VPMS to local VPMS (and vice-versa) is proportional to the number of shared pages currently being used in the application. In one embodiment, to minimize the amount of memory being copied during updates and during thread context switching, the different memory regions are partitioned at the first level of the VPMS. In the example embodiment for an IA32 platform, a typical implementation would separate the different memory regions at the PD level. Hence, for every 4 MB (of 4K pages) and 4 GB (of 4 MB pages) the context requires only one machine word (32-bits) to be copied.

In one embodiment, for instruction memory, the same set of PTs and therefore, the same set of PT pages may be shared across all threads. Thus, for instruction memory, PD entries remain the same for all threads. For shared memory, which may be made 4 MB aligned, the same set of PT pages and corresponding PD entries will be maintained as a global VPMS.

In one embodiment, the system 1000 includes multiple cores 1010 that each include a TLB 1030 and CR3 1040 (e.g., BAR). In one embodiment, each core 1010, 1011 and 1012 has its own PD 1050 and private PT 1060. In one embodiment, each core 1010, 1011 and 1012 is connected to a shared PT 1070. A page tracking module 1080 and a thread scheduler 1090 are included in one embodiment.

In one or more embodiments, the architecture described may also be supported by modified microprocessor hardware. In one example embodiment, extensions to the IA32 microarchitecture may be introduced to modify the default semantics of CR3 1040 updates so that TLB 1030 flushing is explicitly left to the OS software. This would allow separate VPMS structures to be used on a per-thread basis without the need to copy in local entries from the thread context; ultimately this would improve performance of the one or more embodiments.

FIG. 9 shows example pseudo-code 1100 for a per-core VPMS, per-thread-VPMS memory architecture, according to an embodiment. The example pseudo-code 1100 and example operations shown in FIGS. 10-16 illustrate the following elements of one or more embodiments:

1) The use of thread-local PTs for private data.
2) The use of shared PTs.
3) The use of PTE copying from a global VPMS.
4) How housekeeping is used for the purpose of targeted TLB flushing.

The example embodiment using pseudo-code 1100 does not illustrate that the thread context includes the VPMS base register (e.g., CR3) and how the scheduling updates this context; how remote TLB flushing is performed (which is architecture/system dependent; e.g., one example embodiment is to use an Inter-Process Interrupt to trigger execution of TLB flush commands on the specific core (e.g., CR3 reload, tagged clear or range re-write)).

Figure 10:
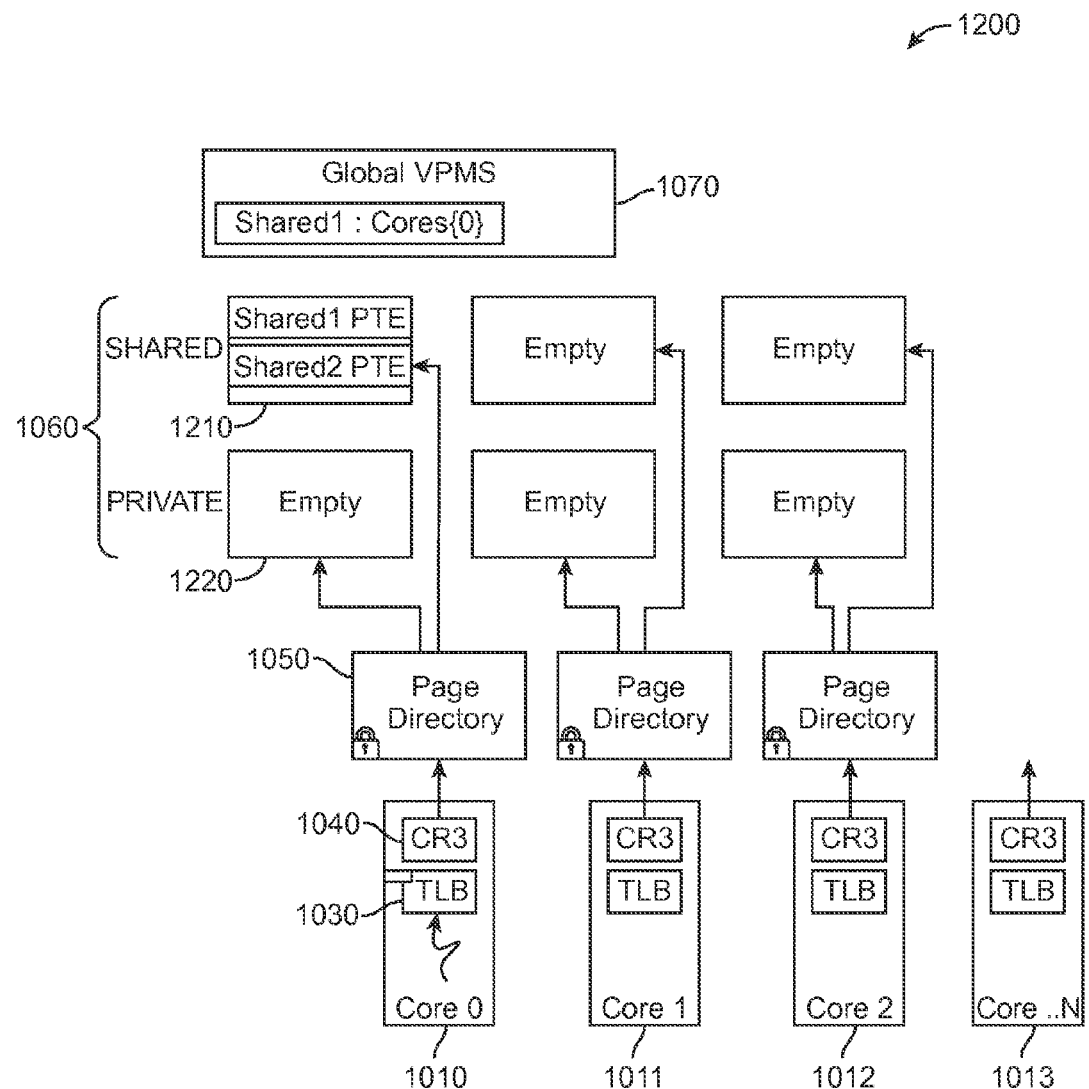
FIG. 10 shows an example process using the pseudo-code of FIG. 9 for a per-core VPMS, per-thread VPMS system, according to an embodiment.

FIG. 10 shows an example process step 1200 using the pseudo-code of FIG. 9 for a per-core VPMS, per-thread VPMS system, according to an embodiment. In one embodiment, the system 1200 includes multiple cores 1010 each including a TLB 1030, a CR3 1040 (e.g., BAR), each core 1010 is connected to a PD 1050 and PT 1060 including a shared region 1210 and a private region 1220, and a global VPMS 1070. As shown, the example process shows a first step (pseudo-code 1100 lines 1-3) where a main thread starts on core 0 1010 and allocates shared pages (Global VPMS entries added).

Figure 11:
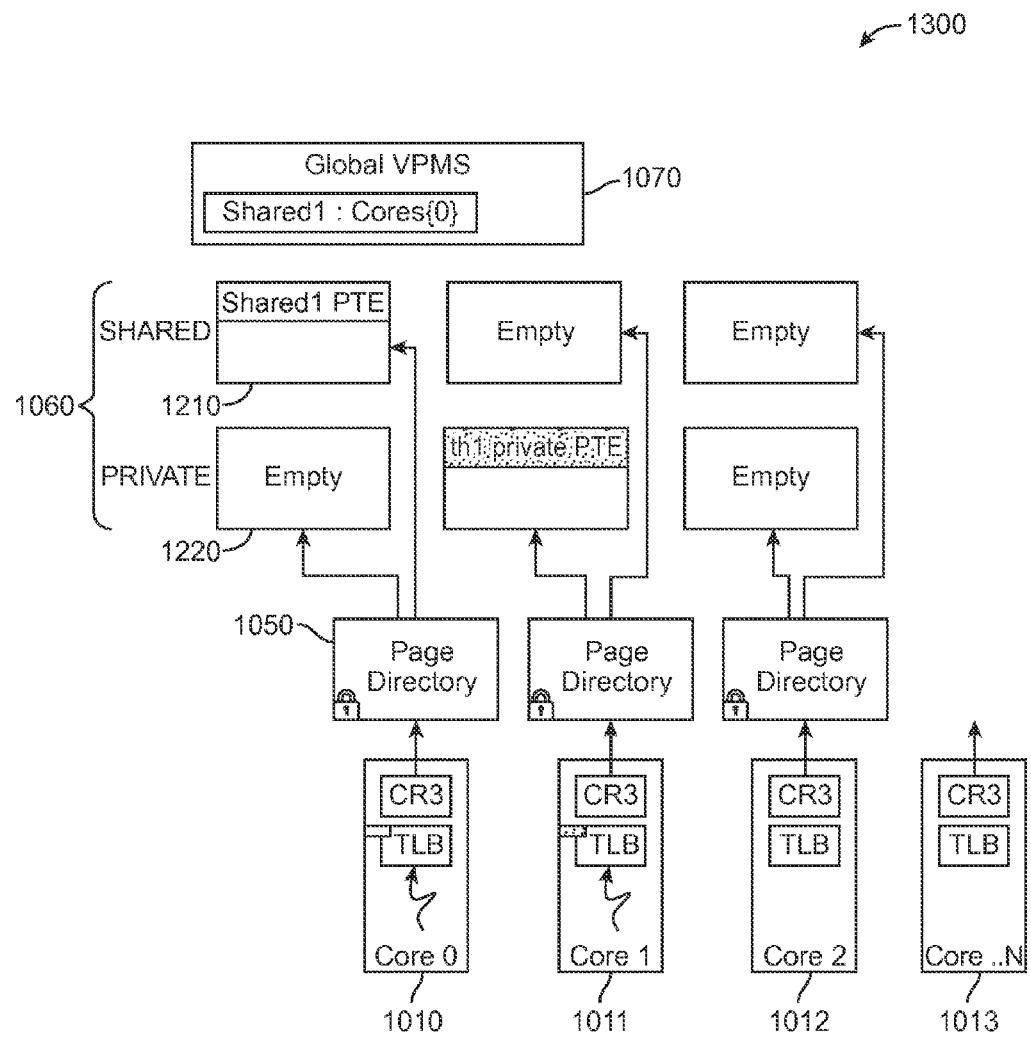
FIG. 11 shows another step in the example process for the per-core VPMS, per-thread VPMS system of FIG. 10, according to an embodiment.

FIG. 11 shows another step 1300 in the example process for the per-core VPMS, per-thread VPMS system of FIG. 10, according to an embodiment. As shown, the example process shows a second step (pseudo-code 1100 line 11) where thread 1 begins to execute on core 1 1011, and third step (pseudo-code 1100 lines 14-16) where thread 1 allocates private pages and manipulates data in them. In one embodiment, during thread 1's manipulation of entries in private region 1220, no contention occurs (i.e., a lock is only needed to create new directory entries which is considered infrequent). Lookups for private PTEs are cached in the core-local TLB 1030.

Figure 12:
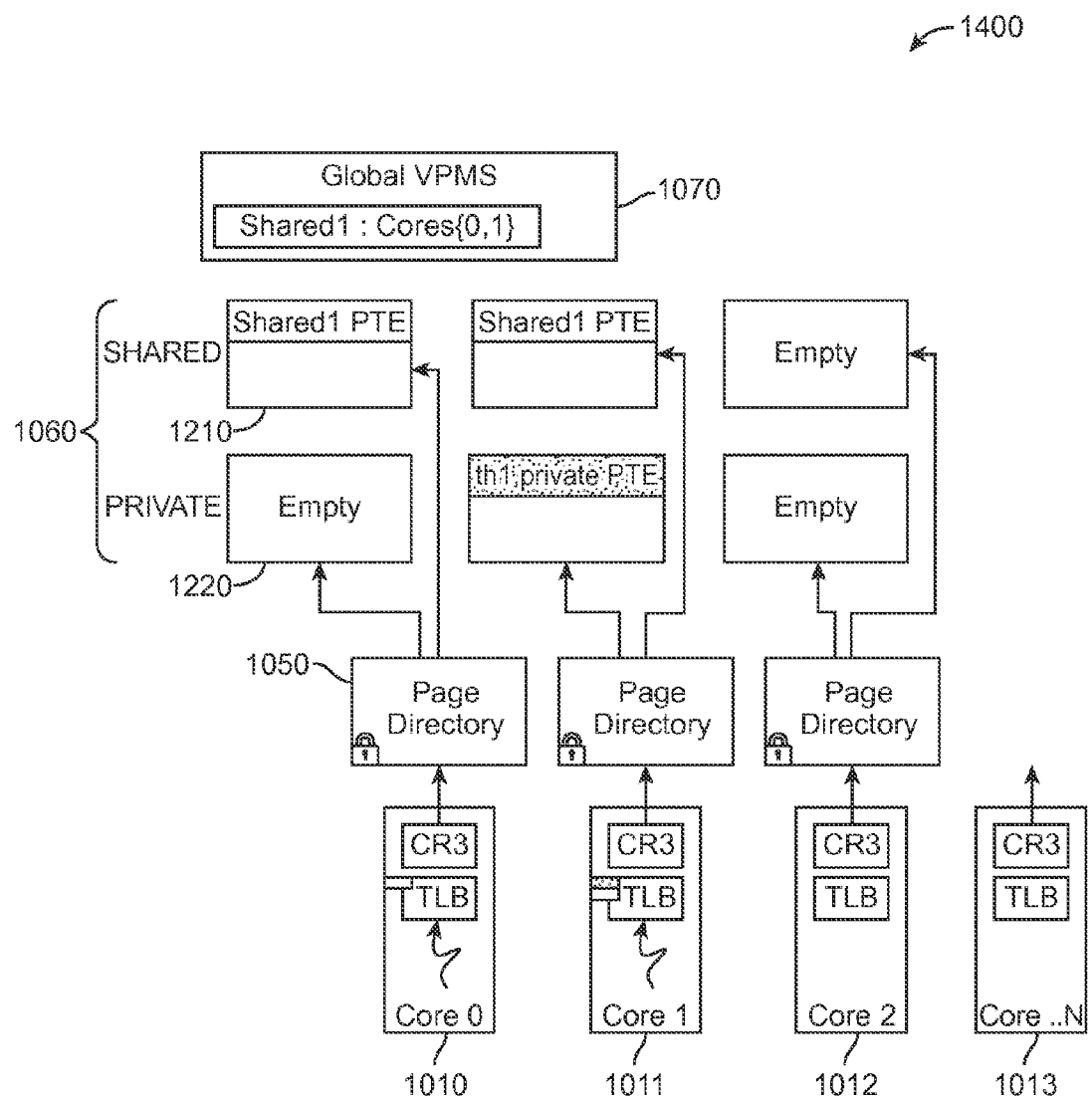
FIG. 12 shows another step in the example process for the per-core VPMS, per-thread VPMS system of FIG. 10, according to an embodiment.

FIG. 12 shows another step 1400 in the example process for the per-core VPMS, per-thread VPMS system of FIG. 10, according to an embodiment. As shown, the example process shows a fourth step (pseudo-code 1100 lines 15 and 17) where thread 1 accesses shared pages. In one embodiment, global VPMS 1070 housekeeping is updated. In one embodiment, modification of PTEs in the shared PTs are facilitated by taking a lock in the Global VPMS 1070, copying the updated PTE to the local (in this case core 0 1010) shared table copy, and then invalidating (e.g., setting the dirty bit) other copies as indicated by the Global VPMS housekeeping. In this embodiment, the shared page PTE in core 0 1010 is invalidated—and a next access to this page by Thread 0 will trigger a "re-copy" from Global VPMS 1070. In one embodiment, Core 1 1010 TLB 1030 caches thread 1's private page translations. Deletions of private PTE entries are localized to core 1 1010 and there is no contention during a private page free.

Figure 13:
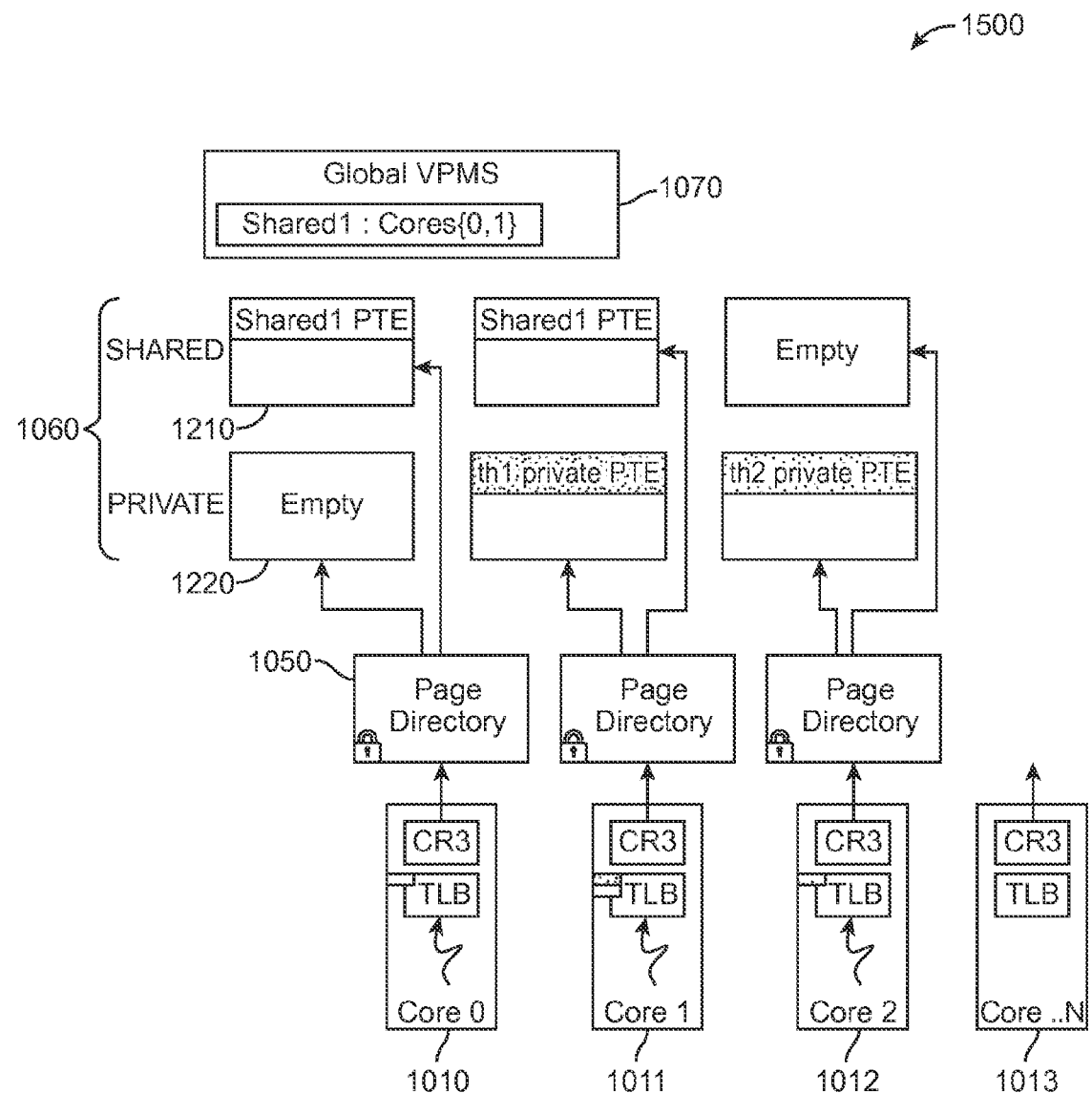
FIG. 13 shows another step in the example process for the per-core VPMS, per-thread VPMS system of FIG. 10, according to an embodiment.

FIG. 13 shows another step 1500 in the example process for the per-core VPMS, per-thread VPMS system of FIG. 10, according to an embodiment. As shown, the example process shows a fifth step (pseudo-code 1100 lines 25-26) where thread 2 begins execution on core 2 1012. In one embodiment, thread 2 proceeds to create private pages and write data to them. Core 2 1012 TLB 1030 caches thread 2's private page translations. In one embodiment, deletions of private PTE entries are localized to core 2 1012 and there is no contention during a private page free.

Figure 14:
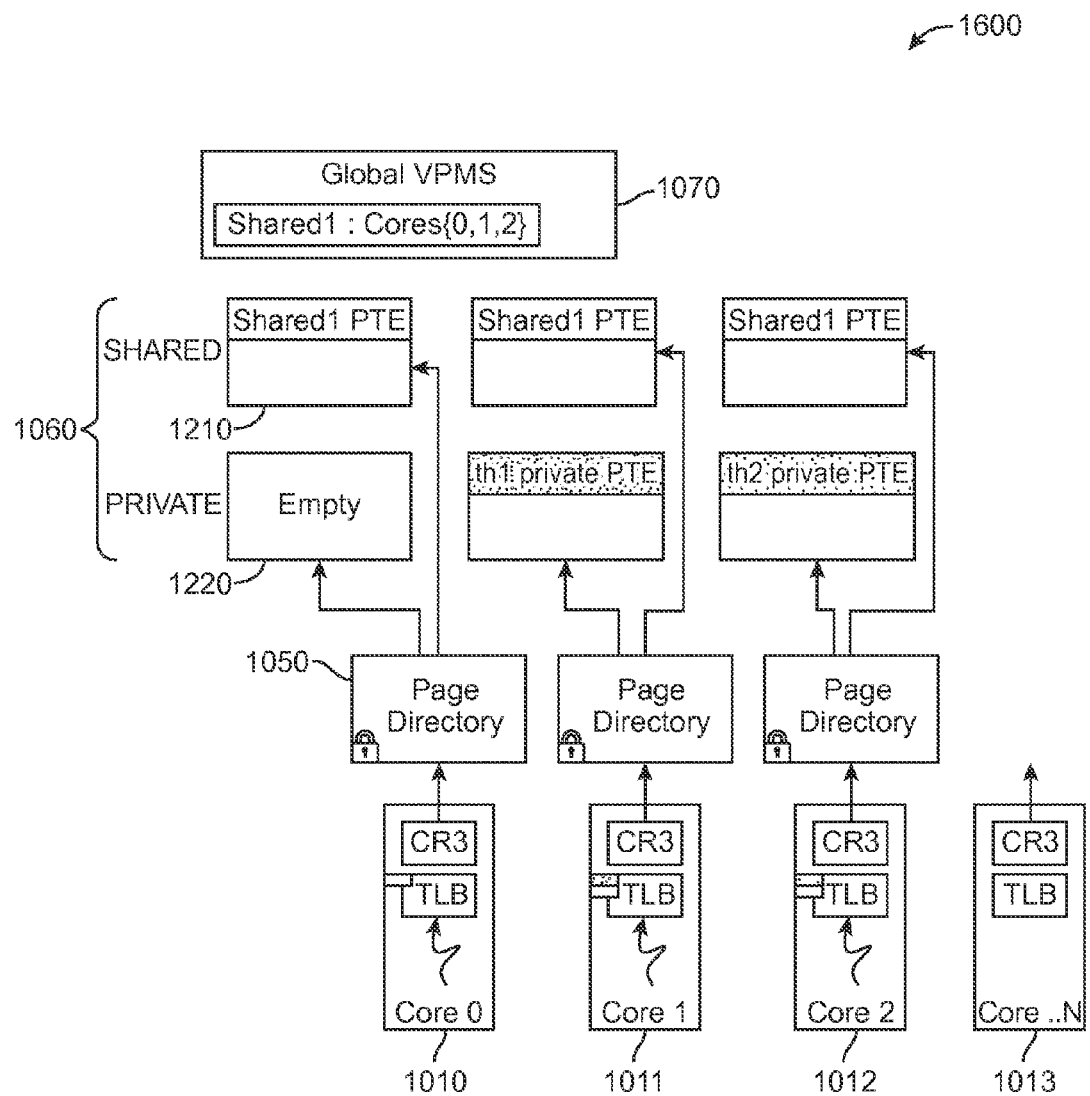
FIG. 14 shows another step in the example process for the per-core VPMS, per-thread VPMS system of FIG. 10, according to an embodiment.

FIG. 14 shows another step 1600 in the example process for the per-core VPMS, per-thread VPMS system of FIG. 10, according to an embodiment. As shown, the example process shows a sixth step (pseudo-code 1100 line 27) where thread 2 accesses a shared page. In one embodiment, during the page-fault (due to no TLB entry and no valid PTE), the Global VPMS 1070 is locked, the housekeeping updated, and a copy of the shared PTE is made into the core-local shared page table 1060. In one embodiment, core 2 1012 TLB 1030 will cache both private and shared PTE translations. In one embodiment, for modification of shared page table entries refer to lines 15 and 17 of pseudo-code 1100 in FIG. 9.

Figure 15:
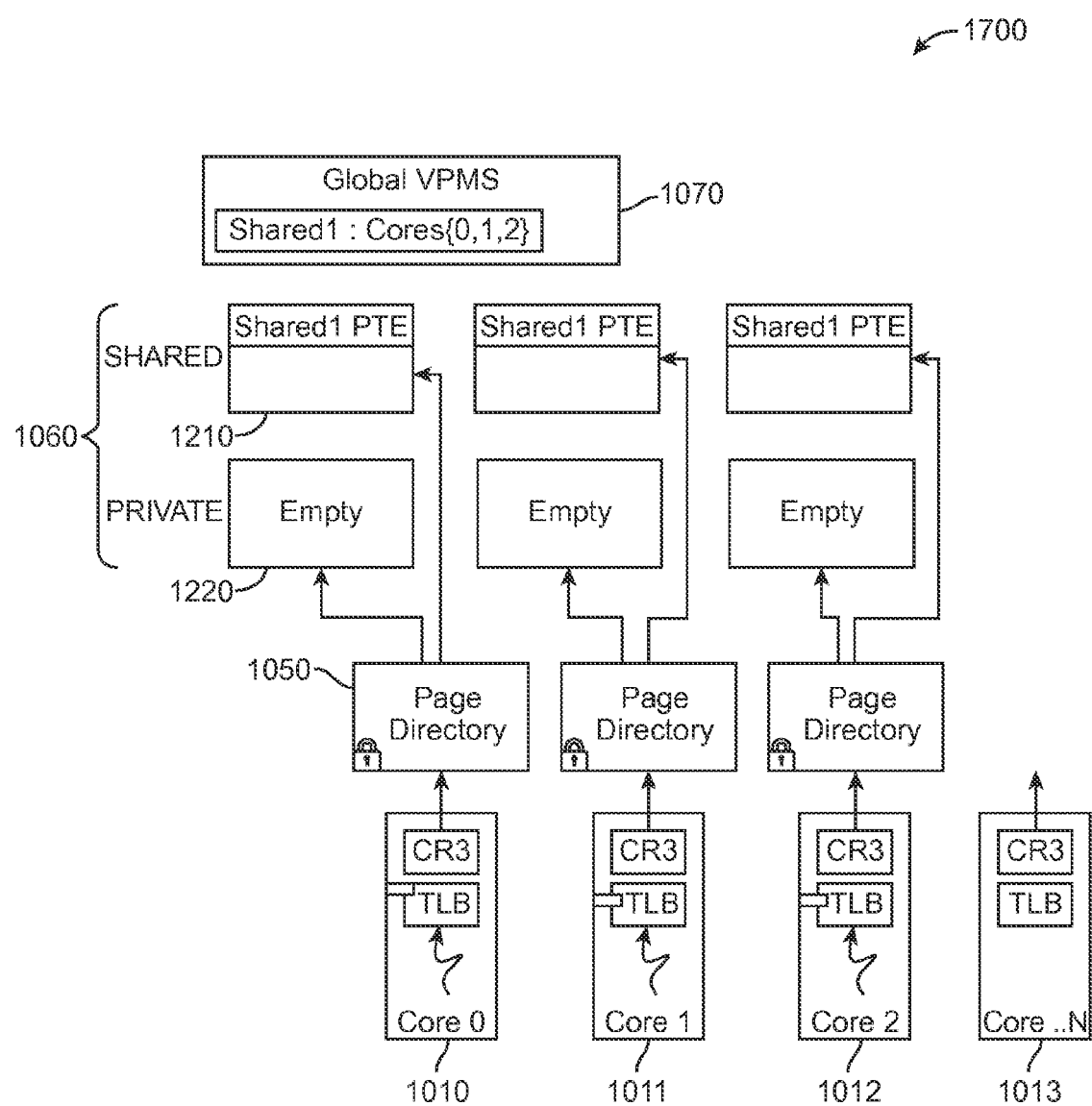
FIG. 15 shows another step in the example process for the per-core VPMS, per-thread VPMS system of FIG. 10, according to an embodiment.

FIG. 15 shows another step 1700 in the example process for the per-core VPMS, per-thread VPMS system of FIG. 10, according to an embodiment. As shown, the example process shows a seventh step (pseudo-code 1100 lines 19 and 31) where thread 1 and 2 completes the loop and joins with the main thread. In one embodiment, private pages have been released. In this embodiment, no contention is incurred during private PTE release. In one embodiment, TLB entries are flushed for core 1 1011 and core 2 1012 to remove invalid entries corresponding to the previously released private PTEs. In one embodiment, if the machine architecture supports tagged-TLBs then specific entries may be knocked down (e.g., AMD64).

Figure 16:
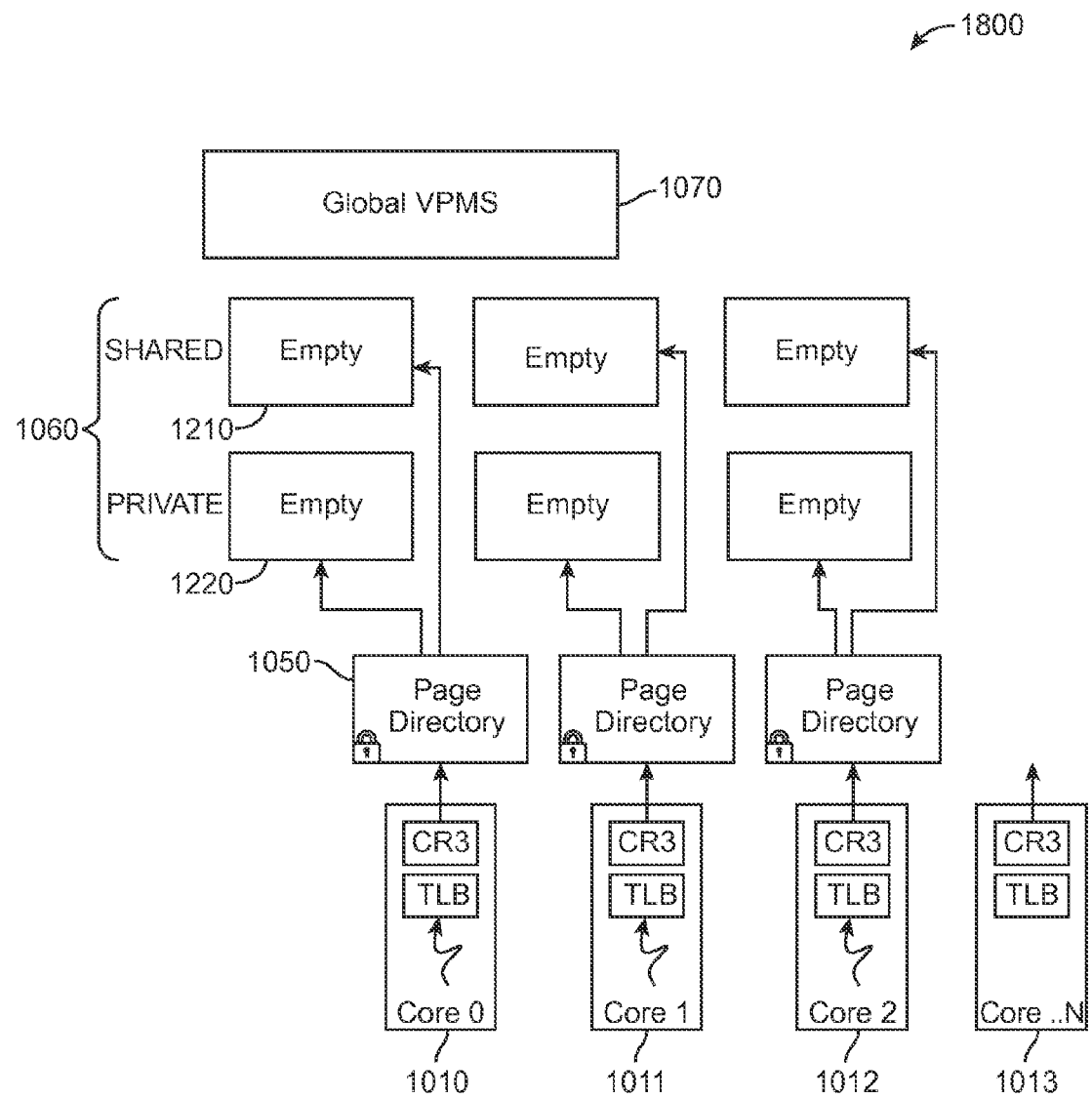
FIG. 16 shows another step in the example process for the per-core VPMS, per-thread VPMS system of FIG. 10, according to an embodiment.

FIG. 16 shows another step 1800 in the example process for the per-core VPMS, per-thread VPMS system of FIG. 10, according to an embodiment. As shown, the example process shows an eighth step (pseudo-code 1100 line 7) where the main thread releases shared memory. In one embodiment, releasing the shared memory requires taking the lock of the appropriate entry in the Global VPMS 1070, then using the housekeeping information to invalidate PTE copies in core 0 1010, core 1 1011 and core 2 1012. In one embodiment, the entry is removed from the Global VPMS 1070. The housekeeping information is used to target TLB flushes to only core 0 1010, core 1 1011 and core 2 1012. Other cores (e.g., core N 1013) are not TLB flushed, according to one embodiment.

As is known to those skilled in the art, the aforementioned example architectures described above, according to one or more embodiments, may be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, one or more embodiments may take the form of an entirely hardware embodiment, an entirely software embodiment or an embodiment containing both hardware and software elements.

Figure 17:
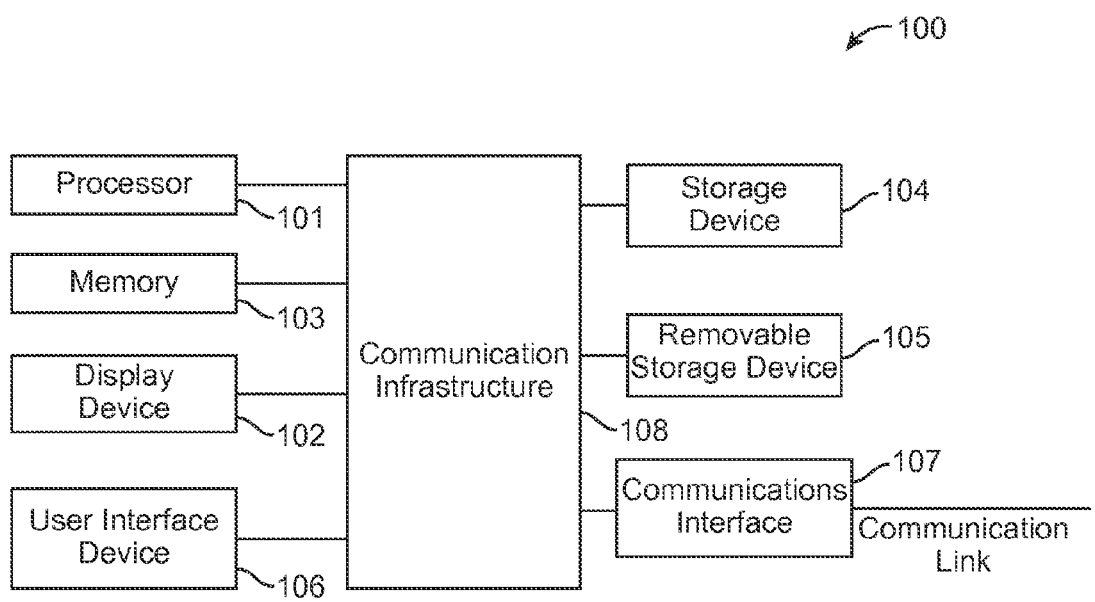
FIG. 17 is an exemplary high-level block diagram showing an information processing system comprising a computer system useful for implementing disclosed embodiments.

FIG. 17 is a high-level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Figure 18:
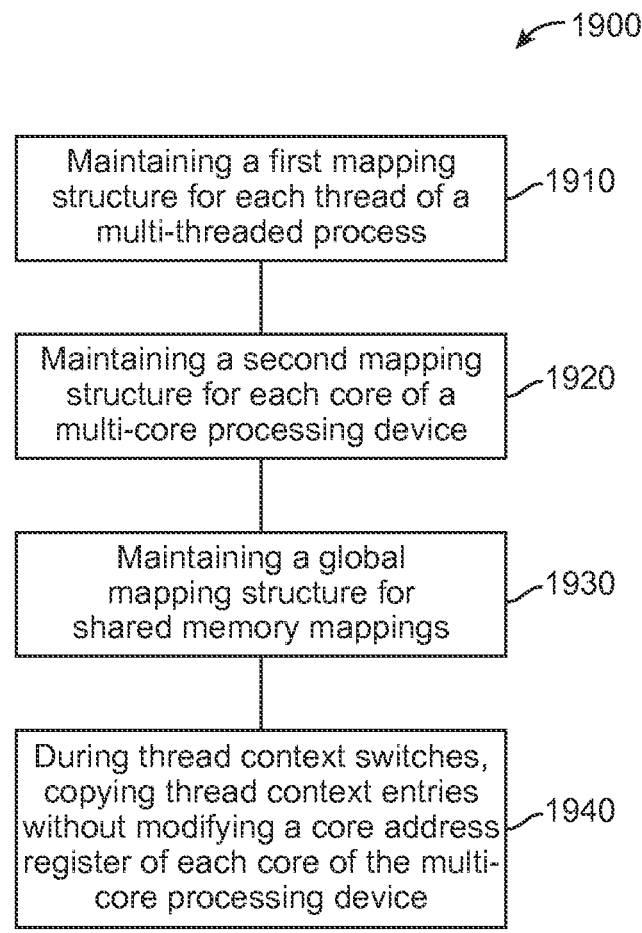
FIG. 18 shows a flowchart of a process for memory management for multi-threaded processes, according to an embodiment.

FIG. 18 shows a flowchart 1900 of a process for memory management for multi-threaded processes, according to an embodiment. In one embodiment, in block 1910 a first mapping structure (e.g., a per-thread VPMS 840, FIG. 6) for each thread of a multi-threaded process is maintained. In one embodiment, in block 1920, a second mapping structure (e.g., a per-core local VPMS 830, FIG. 6) for each core (e.g., cores 810, FIG. 6) of a multi-core processing device is maintained. In one embodiment, in block 1930, a global mapping structure (e.g., global VPMS 1070, FIG. 10) for shared memory mappings is maintained. In one embodiment, in block 1940, during thread context switches, a copy of thread context entries without modifying a page-mapping base address register (e.g., BAR 820, FIG. 6) of each core of the multi-core processing device is performed.

One or more embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method for memory management comprising:
maintaining a first mapping structure for each thread of a multi-threaded process;
maintaining a second mapping structure for each core of a multi-core processing device;
maintaining a global mapping structure for shared memory mappings; and
during thread context switches, copying thread context entries without modifying a page-mapping base address register of each core of the multi-core processing device.

2. The method of claim 1, wherein the first mapping structure comprises a per-thread virtual-physical address mapping structure (VPMS), and the second mapping structure comprises a per-core local VPMS.

3. The method of claim 2, wherein translation lookaside buffer (TLB) flushing is avoided based on the copy during thread context switches.

4. The method of claim 3, wherein each page-mapping base address register comprises a VPMS base address register (BAR).

5. The method of claim 4, wherein each VPMS BAR points to an address of a corresponding per-core local VPMS.

6. The method of claim 4, further comprising:
partitioning virtual memory used by each thread of the multi-threaded process into an instruction region, a private memory region, and a shared memory region.

7. The method of claim 6, wherein each instruction region comprises a plurality of instructions for the multi-threaded process and is shared by each of the threads.

8. The method of claim 7, wherein each private memory region comprises a corresponding thread-local heap and stack data.

9. The method of claim 8, wherein the global mapping structure comprises a global VPMS that comprises mapping entries for each shared memory region.

10. The method of claim 9, wherein lock synchronization is required when accessing shared memory entries in both the global VPMS and a local VPMS.

11. The method of claim 10, further comprising:
synchronizing the local VPMS and the global VPMS based on a thread page-fault that occurs upon a particular thread attempting to access a particular shared memory region.

12. A system comprising:
a multi-core processor having a plurality of processor cores each coupled to a page-mapping base address register; and
a memory including a mapping architecture comprising:
    a first mapping structure for each thread of a multi-threaded process executed by the plurality of cores;
    a second mapping structure for each core of the plurality of cores; and
    a global mapping structure for shared memory mappings of each thread of the multi-threaded process; and
    a page-fault handler that synchronizes data in the global mapping structure and a particular second mapping structure.

13. The system of claim 12, wherein the first mapping structure comprises a per-thread virtual-physical address mapping structure (VPMS), and the second mapping structure comprises a per-core local VPMS.

14. The system of claim 13, wherein each core of the plurality of processor cores is coupled to a translation lookaside buffer (TLB), and TLB flushing is avoided based on performing a copy process performed during thread context switches without modifying the page-mapping base address register of each core of the plurality of processor cores.

15. The system of claim 14, wherein each page-mapping base address register comprises a VPMS base address register (BAR), and each VPMS BAR points to an address of a corresponding per-core local VPMS.

16. The system of claim 15, wherein virtual memory used by each thread of the multi-threaded process comprises an instruction region, a private memory region, and a shared memory region.

17. The system of claim 16, wherein each instruction region comprises a plurality of instructions for the multi-threaded process and is shared by each of the threads, and each private memory region comprises a corresponding thread-local heap and stack data.

18. The system of claim 17, wherein the global mapping structure comprises a global VPMS that comprises mapping entries for each shared memory region.

19. The system of claim 18, wherein lock synchronization is required when accessing shared memory entries in both the global VPMS and a local VPMS.

20. The system of claim 19, wherein the page-fault handler synchronizes the particular local VPMS and the global VPMS based on a thread page-fault that occurs upon a particular thread attempting to access a particular shared memory region.

21. A non-transitory processor computer readable medium that includes a program that when executed by a processor performs a method comprising:
    creating a first mapping structure for each thread of a multi-threaded process;
    creating a second mapping structure for each core of a multi-core processing device;
    creating a global mapping structure for maintaining shared memory mappings; and
    performing a copy of thread context entries during thread context switches without modifying a page-mapping base address register of each core of the multi-core processing device.

22. The non-transitory processor-readable medium of claim 21, wherein the first mapping structure comprises a per-thread virtual-physical address mapping structure (VPMS), and the second mapping structure comprises a per-core local VPMS.

23. The non-transitory processor-readable medium of claim 22, wherein each core of the multi-core processing device includes a translation lookaside buffer (TLB), and TLB flushing is avoided based on the copy during thread context switches.

24. The non-transitory processor-readable medium of claim 23, wherein each page-mapping base address register comprises a VPMS base address register (BAR), and each VPMS BAR points to an address of a corresponding per-core local VPMS.

25. The non-transitory processor-readable medium of claim 24, further comprising:
    partitioning virtual memory used by each thread of the multi-threaded process into an instruction region, a private memory region, and a shared memory region, wherein each instruction region comprises a plurality of instructions for the multi-threaded process and is shared by each of the threads, and each private memory region comprises a corresponding thread-local heap and stack data.

26. The non-transitory processor-readable medium of claim 25, wherein the global mapping structure comprises a global VPMS that comprises mapping entries for each shared memory region, and lock synchronization is required when accessing shared memory entries in both the global VPMS and a particular local VPMS.

27. The non-transitory processor-readable medium of claim 26, further comprising:
    synchronizing the particular local VPMS and the global VPMS based on a thread page-fault that occurs upon a particular thread attempting to access a particular shared memory region.

\* \* \* \* \*